United States Patent

[11] 3,579,965

[72] Inventor Johnnie J. Musgrove
    1604 Amberly Road, Charleston, S.C. 29407
[21] Appl. No. 788,287
[22] Filed Dec. 31, 1968
[45] Patented May 25, 1971

[54] MOWING MACHINE
    9 Claims, 8 Drawing Figs.
[52] U.S. Cl. .................................................. 56/7, 56/26, 56/504, 180/49
[51] Int. Cl. .................................................. A01d 75/30
[50] Field of Search .................................................. 56/6, 7, 25, 25.4, 26, 504, 505; 180/44, 47, 49, 48, 50

[56] References Cited
UNITED STATES PATENTS

| | | | |
|---|---|---|---|
| 1,113,101 | 11/1914 | Chase | 56/7 |
| 1,556,965 | 10/1925 | Seeley | 56/7 |
| 2,711,067 | 6/1955 | Mott | 56/26X |
| 2,936,561 | 5/1960 | Grimes | 56/7 |
| 3,038,286 | 6/1962 | Hall | 56/7 |
| 3,048,233 | 8/1962 | Crain et al. | 180/49 |
| 3,122,871 | 3/1964 | Frevik et al. | 56/26X |
| 3,177,638 | 4/1965 | Johnson | 56/26X |
| 3,433,003 | 3/1969 | Musgrove | 56/26 |

FOREIGN PATENTS

| | | | |
|---|---|---|---|
| 103,892 | 1/1938 | Great Britain | 56/7 |
| 989,914 | 4/1965 | Great Britain | 56/7 |

OTHER REFERENCES

V. Lee Oertie, The Three-Wheeled Desert Scout, Popular Science Dec. 1961, p. 139— 142

Primary Examiner—Louis G. Mancene
Assistant Examiner—J. A. Oliff
Attorney—T. Russell Foster ABSTRACT: A four-wheel drive mowing machine including a frame having pairs of driven front and rear wheels provided with tires, the width of the tires being substantially greater than the width of the sidewalls. The front wheels are mounted on opposite ends of an axle mounted on the frame for pivotal movement in a substantially vertical plane about the frame central axis and a pair of laterally extending front cutters are supported on the frame on opposite sides of the central axis together with a rear cutter supported on the frame and arranged centrally of the central axis between the rear wheels.

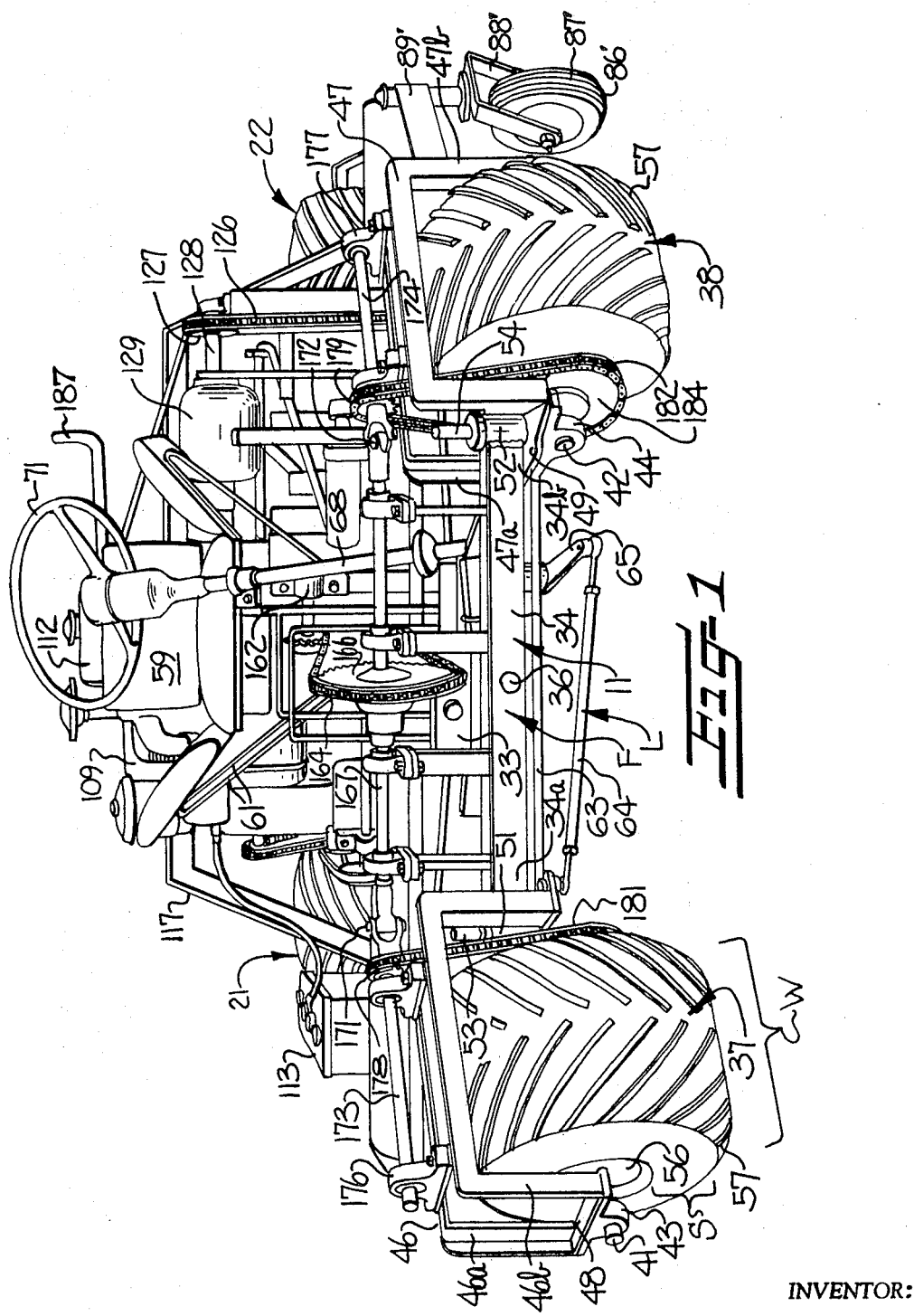

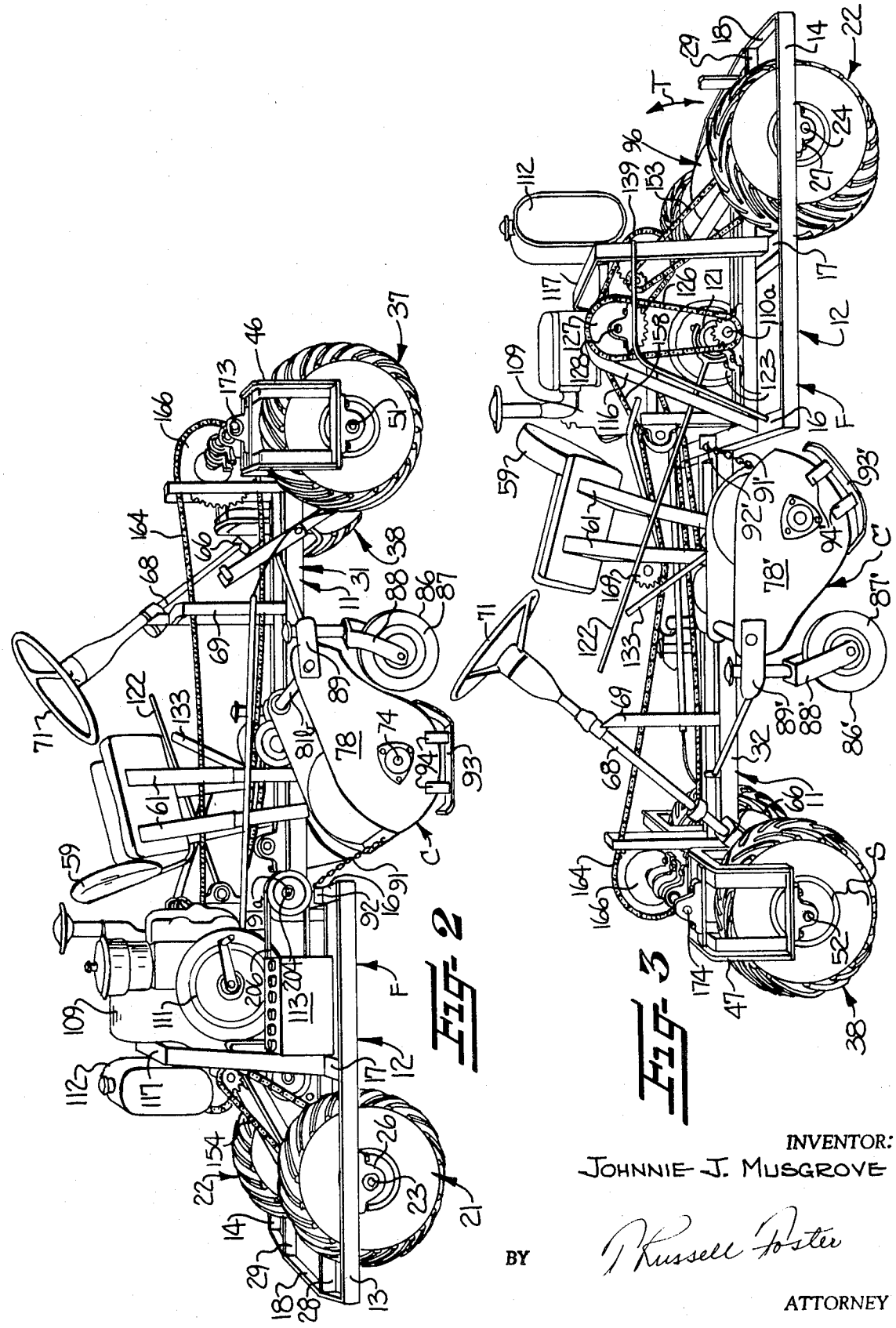

INVENTOR:
JOHNNIE J. MUSGROVE
BY
T. Russell Foster
ATTORNEY

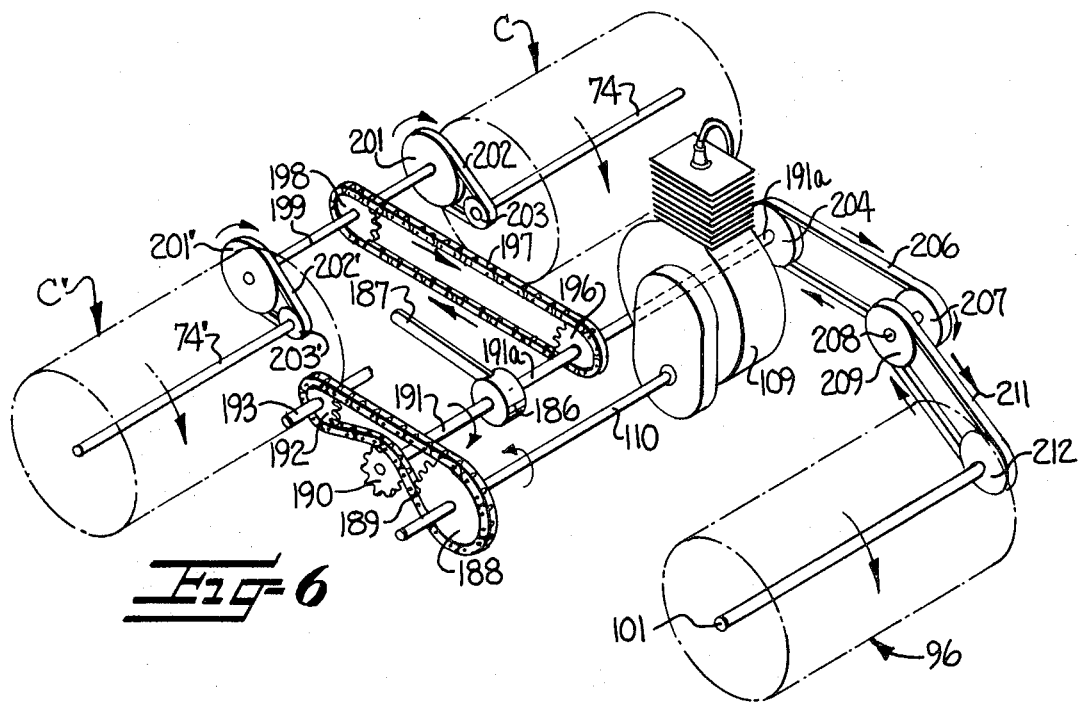
Fig-6
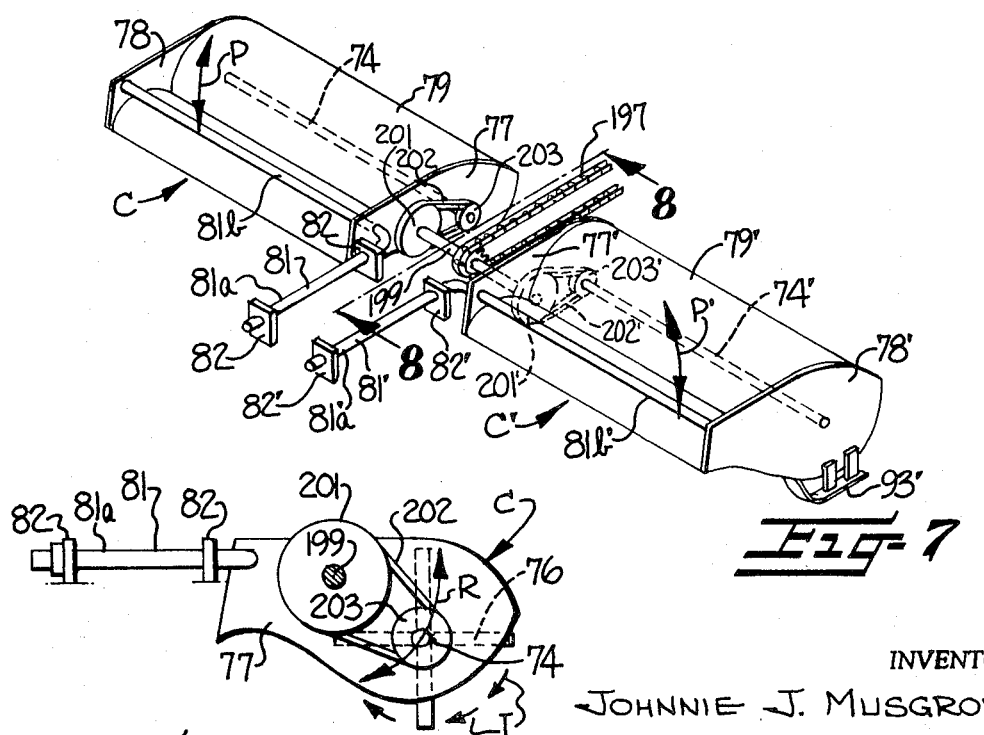
Fig-7
Fig-8
INVENTOR:
JOHNNIE J. MUSGROVE
BY R. Russell Foster
ATTORNEY

MOWING MACHINE

This invention relates to a mowing machine and more particularly to a four-wheel drive, rider steered mower for cutting both flat and sloping terrain.

Many types of machines for cutting or mowing terrain covered with grassy foliage such as grass, weeds and the like are available today. One type of such a mowing machine utilized to cut relatively large areas of terrain in a minimum of time includes an integral power plant such as a gasoline motor for propelling the machine as well as for rotating cutters mounted on the machine. The machine is generally arranged to be steered by an operator accommodated in a suitable seat provided on the machine. Such a "rider-steered" mowing machine may be equipped with any suitable type of cutter such as a rotary cutter, reel-type cutter or the like.

The typical rider-steered power driven mowing machine available today has certain disadvantages for which a solution has long been sought. For instance, the construction of such machines has imposed a limitation on the size of cutters which may be mounted on the machine with the result that only a limited area of terrain is cut adjacent the path through which the machine moves. In addition, where the terrain is irregular, it is not uncommon for "scalping" to occur as the cutters move too close to or even into the turf leaving an unsightly appearance on the terrain and the heavy weight as well as the large diameter wheels of such present day mowers frequently cause considerable damage to the turf with resultant marring of the turf and the creation of soil erosion problems.

An even greater problem is encountered with the use of such present day mowing machines due to rider-steered relative instability of such machines. Most of the rider-driven mowing machines available today utilize only rear wheel drives and are designed primarily for the cutting of relatively even or flat terrain. The instability of such present day machines, most of which are characterized by a high center of gravity, results in frequent overturning of such mowers when used to cut relatively steep slopes with resultant damage and personal injury. The need for a mowing machine which will negotiate relatively steep slopes, that is slopes having an angle of up to 45° or even greater in a proper manner and without overturning has long existed and the mowing machine described and claimed in applicant's copending application entitled Mowing Machine, Ser. No. 536,800, now U.S. Pat. No. 3,433,003, has performed fairly well in solving this problem. However, slopes in existence today which require mowing, particularly those slopes associated with ammunition magazines, highway embankments, ditches and the like, are exceedingly steep approaching 60° and higher and there is a pressing need for a mowing machine which will negotiate these steep slopes with absolutely no possibility of overturning and which permit the carrying out of an efficient mowing operation in a minimum of time without disfiguring the appearance of the slope.

Accordingly, a primary object of this invention is to provide a new and novel mowing machine of the rider-steered power driven type provided with a four-wheel drive.

Another object of this invention is to provide a new and novel mowing machine of the rider-steered, power drive type which is suitable for operation on not only flat terrain but unusually steep slopes as well.

Still another object of this invention is to provide a new and novel mowing machine of the rider-steered power driven type which may be used in a cutting operation on slopes having an angle up to 45° or greater in any direction of movement on such slopes but without any risk of overturning so as to eliminate damage or personal injury as well as any destruction to the slope surface.

Still another object of this invention is to provide a new and novel mowing machine of the rider-steered, power driven type which conforms readily during use to irregular terrain being mowed so as to eliminate improper mowing such as scalping or the like and which utilizes a novel arrangement of cutters which enables a wide swath of grass or the like to be mowed in a highly efficient manner along the path of the machine.

This invention further contemplates the provision of a new and novel mowing machine of the rider-steered power driven type which incorporates pneumatic tires of substantial width, low pressure and large air volume in combination with a novel cutter arrangement for highly efficient, wide area mowing while leaving a mowed surface of attractive appearance, which may be moved freely in any direction with a high degree of maneuverability throughout both flat and unusually steep terrain areas without risk of overturning and which may be easily operated by a relatively unskilled operator to produce an efficiently mowed surface.

Other objects and advantages of the invention will become apparent from the following description taken in connection with the accompanying drawings.

The objects stated above and other related objects in this invention are accomplished by the provision of a mowing machine which includes a frame on the front end of which is mounted a transversely extending axle member for pivotal movement in a substantially vertical plane on the central axis of the frame. A pair of rotatable rear wheels are provided in oppositely disposed relationship on the rear end of the frame and a pair of front wheels are rotatably supported on opposite ends of the axle member for pivotal movement on an axis extending substantially perpendicular to the axle member through steering means accessible from an operator seat supported on the frame intermediate the front and rear wheels. Each of the front and rear wheels include a low pressure pneumatic tire having a width substantially greater than the radial width of the tire sidewall. A pair of laterally extending cutters are positioned on opposite sides of the frame central axis intermediate the front and rear wheels and a rear cutter is supported on the frame between the rear wheels in centrally aligned relationship with the central axis. Power means are supported on the frame which are drivably connected to all of the wheels and to the cutters.

The novel features which are believed to be characteristic of the invention are set forth with particularity in the appended claims. The invention itself, however, both as to its organization and method of operation may be best understood by reference to the following description taken in conjunction with the accompanying drawings in which:

FIG. 1 is a front view of the mowing machine of the invention;

FIG. 2 is a side view of one side of the machine of FIG. 1;

FIG. 3 is a side view of the other side of the machine of FIG. 1;

FIG. 6 is a perspective view of the driving arrangement for the cutters of the machine of FIG. 1;

FIG. 7 is a perspective view of a portion of the machine of FIG. 1; and

FIG. 8 is a sectional view taken substantially along line 8—8 of FIG. 7 in the direction of the arrows.

Figure 4:
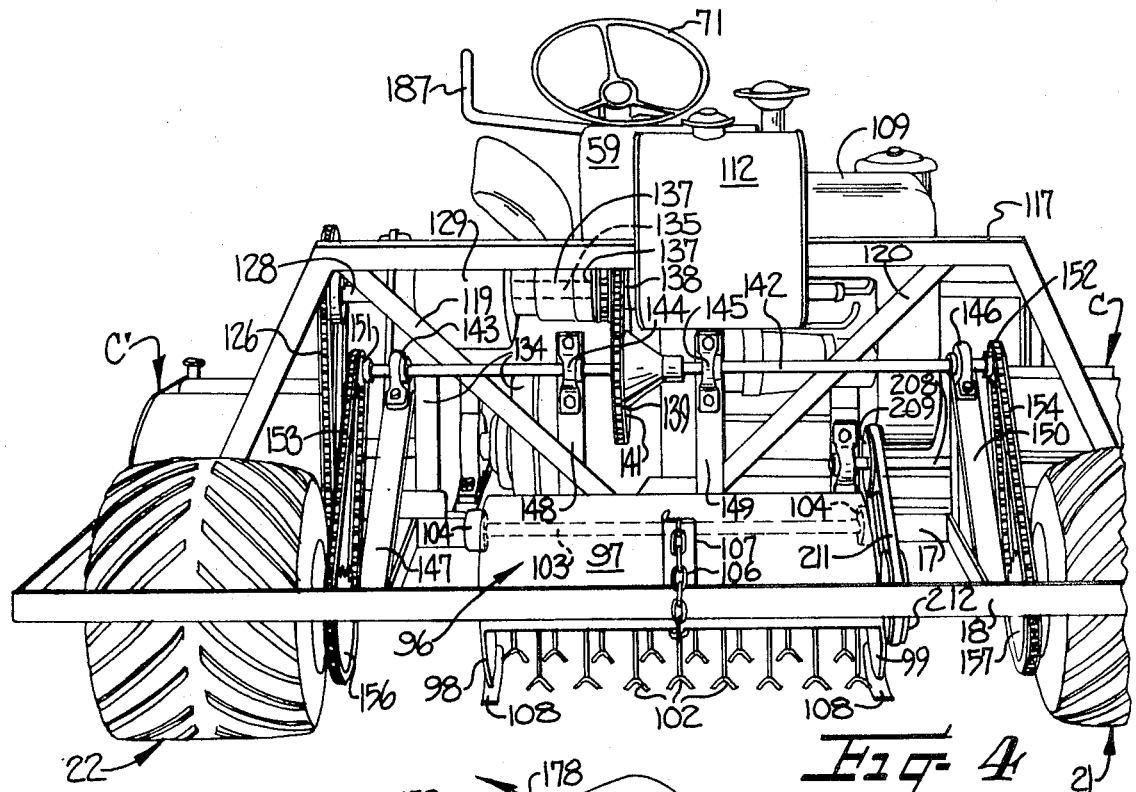
FIG. 4 is a rear view of the machine of FIG. 1 partially broken away.

Referring now to the drawings and to FIGS. 1—4 in particular, there is shown a mowing machine constructed in accordance with the invention which includes a frame designated generally by the letter F. The frame F includes a front portion designated generally by the numeral 11 and a rear portion designated generally by the numeral 12. In the illustrated embodiment, the front and rear portions 11, 12 respectively extend in a substantially horizontal plane.

The frame rear portion 12 preferably includes side frame members 13, 14 interconnected by cross frame members 16, 17, 18. Cross frame member 18 defines the rear end of the frame F adjacent which is positioned in oppositely disposed relationship for rotation on a horizontal axis, a pair of rear wheels 21, 22 of a type to be explained hereinafter. The rear wheels 21, 22 are preferably positioned on stub shafts 23, 24 supported for rotation in pairs of bearing blocks 26, 27 respectively, bearing blocks 26 being suitably secured as shown in FIGS. 2, 3 to the undersides of side frame member 13 and an associated frame member 28 suitably secured by welding or the like to the cross frame members 17, 18 as shown best in FIG. 2. The pair of bearing blocks 27 for wheel 22 are similarly secured to the undersides of side frame member 14 and associated frame member 29 secured by welding or the like to the cross frame members 17, 18 in parallel, spaced relationship with frame member 28.

The frame front portion 11 preferably includes a pair of longitudinally extending frame members 31, 32 suitably secured at one end by means such as welding or the like to the frame rear portion 12 and positioned in spaced parallel relationship by means such as a plurality of transversely extending bracing members 33 as shown best in FIG. 1. The frame members 31, 32 therefore define therebetween a central axis extending longitudinally throughout the frame F and the forward end of frame members 31, 32 define a front end for the frame F.

A transversely extending front axle member 34 is pivotally mounted intermediate its ends 34a, 34b on the front end of the front portion 11 of frame F for pivotal movement on the frame central axis in a substantially vertical plane. More specifically, the front axle member 34 is supported on the forward end of the frame members 31, 32 by means such as a pivot rod 36 extending therethrough and preferably supported on the bracing members 33 as shown. The pivot rod 36 is positioned substantially coincident with the frame central axis and is arranged to support the front axle member 34 substantially centrally intermediate its ends 34a, 34b.

The mowing machine of the invention includes a pair of front wheels 37, 38 and means are provided for supporting the front wheels at opposite ends of the front axle member 34 for rotation on a horizontal axis and for pivotal movement on an axis extending substantially perpendicular the axle member 34. More specifically, the front wheels 37, 38 are positioned for rotation on a horizontal axis on stub shafts 41, 42 supported at their ends in pairs of bearing blocks 43, 44 suitably secured to the undersides of the ends of support frames 46, 47 respectively. As shown best in FIG. 1, each of the support frames 46, 47 is preferably of inverted U-shaped configuration and includes pairs of U-shaped members 46a, 46b and 47a, 47b secured together in spaced relationship at their free ends by bearing support members 48, 49 respectively.

In order to support the front wheels 37, 38 for pivotal movement on a vertical axis extending substantially perpendicular to the axle member 34, journals 51, 52 are suitably mounted in an upstanding position by welding or the like on the ends 34a, 34b respectively of the front axle member 34. The journals 51, 52 are arranged to accommodate vertically extending pivot shafts 53, 54, the bottom ends of which are suitably connected to the inner bearing support members 48, 49 on the support frames 46, 47 respectively.

The rear wheels 21, 22 and the front wheels 37, 38 are all substantially identical in construction and consequently like numerals will be used to identify like parts. As shown best in FIGS. 1, 3, each wheel includes a rim 56 of relatively small diameter on which is positioned a cylindrical, low-pressure pneumatic tire 57. In accordance with one of the novel features of the mowing machine of the invention, the width W of the tire 57 as shown in FIG. 1 is substantially greater than the radial width of the tire sidewall as identified by the letter S in FIG. 3 to thereby provide a high air volume for the tires. Preferably, the width W of the tire 57 is a multiple of the radial width S of the tire sidewall.

The type of tire which is incorporated in the wheels 21, 22, 37, 38 is a commercially available tire referred to as the "TERRA-TIRE" which is manufactured by the Goodyear Tire and Rubber Company of Akron, 36 Ohio. Such "TERRA-TIRES" are characterized by high flotation characteristics and flexibility due to the low pressure as low as 2 p.s.i.), a large air volume and a very small ground pressure per square inch.

As the mowing machine of the invention is of the type referred to as "ridersteered," an operator's seat 59 is provided intermediate the front wheels 37, 38 and the rear wheels 21, 22 as shown best in FIGS. 2, 3. 2, The operator's seat 59 is suitably supported on the frame F by suitable means such as upstanding support members 61. Preferably, the support members 61 are secured at their lower ends to the frame members 31, 32.

The mowing machine of the invention includes steering means accessible from the operator's seat 59 for pivotally moving the front wheels 37, 38 about the axis defined by the pivot shafts 53, 54 for guiding the movement of the mowing machine on the supporting surface such as the ground. More specifically, a steering arrangement of conventional construction designated generally in FIG. 1 by the letter L is provided which includes a rod or "drag link" 63 pivotally connected at its ends to the adjacent inner ends of the support frames 46, 47. The inner end of one of the support frames such as support frame 46 is also pivotally connected to one end of a steering linkage 64, the other end of which is pivotally connected to a pivot arm 65 as shown best in FIG. 1.

As shown best in FIGS. 2, 3, the pivot arm 65 is connected to a steering sector 66 supported on the frame front portion 11. The steering sector 66 is connected in the conventional manner to the lower end of a steering column 68 suitably supported for rotation on the frame front portion 11 by means such as a support bracket 69. The upper end of the steering column 68 has supported thereon a steering wheel 71 which may be rotated by the operator accommodated within the seat 59 to pivot the front wheels 37, 38 simultaneously through the steering arrangement L, the wheels 37, 38 being maintained in parallel relationship by means of the drag link 63 for guiding the movement of the mowing machine. As has been explained, pivotal movement of the wheels 37, 38 is permitted by means of the pivot shafts 53, 54 rotating in the journals 51, 52 respectively.

The grass cutting means associated with the mowing machine of the invention includes a pair of transversely aligned, laterally extending front cutters designated generally by the letters C, C' as shown best in FIGS. 2, 3 and 7. Means are provided for supporting the front cutters C, C' on the frame F for bidirectional pivotal movement between an elevated inoperative position and a cutting position. As the cutters C, C' and their supporting means are substantially identical in construction, like numerals will be employed to identify like parts, with a prime identification for the parts for cutter C'.

Referring now to FIG. 7, each of the cutters C, C' are of the hammer knife type including shafts 74, 74' having pivotally mounted thereon a plurality of uniformly spaced flails or knives 76, 76' respectively. The shafts 74, 74' are rotatably supported in inner and outer end plates 77, 78 and 77', 78' of cutter housings 79, 79' respectively, so that rotation of the shafts 74, 74' in the direction indicated by the arrows I in FIG. 8 produces a cutting action on the grass or other growth by the flails 76, 76'.

The means for supporting the cutters C, C' for bidirectional pivotal movement include means for supporting the cutters for pivotal movement on an axis extending transversely of the frame F in substantially parallel relationship with the cutter shafts 74, 74' as indicated by the double arrow R in FIG. 8 and means for supporting the cutters for pivotal movement on an axis extending longitudinally of the frame F adjacent the frame central axis as indicated by the double arrows P, P' of FIG. 7. More specifically, as shown in FIG. 7, L-shaped rods 81, 81' having leg portions 81a, 81b and 81a', 81b' are associated with the front cutters C, C' respectively as shown. The longitudinally extending leg portions 81a, 81a' the rods 81, 81' are rotatably mounted in spaced brackets 82, 82' suitably secured by welding or the like to the frame members 31, 32 of the frame front portions 11. The transversely extending rod leg portions 81b, 81b' are inserted through the cutter housing end plates 77, 78 and 77', 78' so that the cutter shafts 74, 74' are in substantially parallel relationship with the rod leg portions 81b, 81b' with the leg portions 81b, 81b' serving as an axis of rotation for the pivotal movement of the cutters as indicated by the double arrow R of FIG. 8. At the same time, rotation of the leg portions 81a, 81a' within the brackets 82, 82' permit pivotal movement of the cutters C, C' in the direction indicated by the double arrows P, P'.

Means are provided for positioning the front cutters C, C' in the cutting position shown best in FIG. 2. More specifically, the outer ends of the cutters C, C' are provided with freely rotatable support wheels designated generally by the numerals 86, 86' respectively. The wheels 86, 86' are preferably of the "caster-type" provided with rubber tires 87, 87'. The wheels 86, 86' are rotatably supported on yokes 88, 88' mounted for vertical adjustment in brackets 89, 89' secured to the outer end plates 78, 78' respectively as shown. The engagement of the wheels 86, 86' with the supporting surface or ground supports the outer end of the front cutters C, C' respectively so as to limit the downward pivotal movement of the front cutters in the direction of the arrows P, P' and thereby maintain the cutters C, C' in the cutting position.

The positioning means for the cutters C, C' also includes adjustable means connected to the frame F and to each of the cutters C, C' for limiting the downward pivotal movement of the cutters C, C' in the direction of the arrow R to the cutting position. In the preferred embodiment, the adjustable means include link chains 91, 91' secured at one end to the cutter housings 79, 79'. The chains 91, 91' are arranged to engage, at a selected length, retaining brackets 92, 92' respectively suitably secured on the frame crossmember 16 as shown best in FIGS. 2, 3 to thereby maintain, together with the wheels 86, 86', the cutters C, C' in the cutting position.

In order to prevent a deeper cutting action by the cutters C, C' or what is referred to as "scalping" when the wheels 86, 86' enter a depressed area such as a hole in the ground thereby reducing the clearance between the flails 76, 76' and the ground, shoe members 93, 93' are disposed rearwardly of the wheels 86, 86' and secured by means such as brackets 94, 94' to the cutter outer end plates 78, 78' respectively. When one of the wheels 86, 86' enters a hole permitting the outer end of the cutter to approach the ground, the shoe members 91, 91' engage the supporting surface or ground slidably to maintain a minimum spacing between the flails and the ground thereby eliminating scalping. Preferably, the wheels 86, 86' are arranged to normally support the cutters C, C' at a position such that the shoe members 93, 93' are approximately 3 to 4 inches above the ground.

The mowing machine of the invention also includes a transversely extending rear cutter 96 supported on the frame F between the rear wheels 21, 22 in centrally aligned relationship with the central axis of the frame F. More specifically, as shown best in FIG. 4, the rear cutter 96, which is similar in construction to the front cutters C, C' is of the hammer knife-type including a housing 97 having end plates 98, 99. A shaft 101 is rotatably supported on the end plates 98, 99 and pivotally mounted on the shaft 101 are a plurality of longitudinally spaced flails 102.

Means are provided for supporting the rear cutter 96 for pivotal movement in the direction of the double arrow T of FIG. 3 between an elevated inoperative position and a cutting position on an axis extending transversely of the frame F in substantially parallel relationship with the shaft 101. More specifically, the rear cutter housing is supported on a pivot rod 103 extending in substantially parallel, spaced apart relationship with the cutter shaft 101 and having ends suitably mounted for rotation on a pair of spaced brackets 104 suitably secured by welding or the like to the cross frame member 17 of the frame rear portion 12. Thus, the rear cutter 96 is centrally positioned relative to the central axis of the frame F between the cross frame members 17, 18 and the longitudinally extending frame members 28, 29 as shown best in FIG. 4.

Means are provided on the rear cutter 96 for maintaining the rear cutter in the cutting position during the movement of the mowing machine over the supporting surface or ground to be mowed. More specifically, as in the arrangement provided for the front cutters, C, C', adjustable means such as a chain 106 is secured at one end to the rear cutter housing 97. The links of the chain are arranged to be selectively engaged with a retaining bracket 107 mounted on the cross frame member 18 so as to support and maintain the rear cutter 96 in a selected cutting position. Additionally, shoe members 108 similar to the shoe members 91, 91' of the front cutters C, C' respectively are provided on the end plates 98, 99 of the rear cutter 96 which slidably engage the ground when one of the rear wheels 21, 22 enters a hole or the like on the ground thereby similarly preventing scalping by the rear cutter 96.

The mowing machine of the invention is of the power driven type and suitable power means are positioned on the frame F for supplying the motive power for the machine. More specifically, the power means comprises a gasoline motor 109 of conventional construction having an output shaft 110, a flywheel 111, a gas tank 112 and a starting battery 113 and is secured by suitable means such as bolts or the like to upstanding transversely extending frame members 116, 117 of generally U-shaped configuration. The frame members 116, 117 are preferably secured at their lower ends to the cross frame members 16, 17 of the frame rear portion 12 as shown best in FIGS. 2, 3. The members 116, 117 are supported in spaced relationship by a plurality of longitudinally extending bracing members 118 as shown best in FIG. 3 and angularly disposed bracing members 119, 120 as shown in FIG. 4.

Means are provided for drivably connecting the power means or gasoline motor 109 to the front and rear wheels 37, 38 and 21, 22 respectively and to the front and rear cutters C, C' and 96 respectively. More specifically, the connecting means includes a first clutch 121 having an operating lever 122 accessible from the operator's seat 59. The clutch 121 is connected to the motor output shaft 110 as shown best in FIG. 5. As shown in FIG. 3, the motor output shaft 110 is journaled in spaced bearing blocks 123.

The connecting means also includes first shaft means for drivably connecting the front and rear wheels to the motor output shaft 110 through the first clutch 121. More specifically, a drive sprocket 124 is secured to the outer end of a shaft 110a connected through the clutch 121 to the motor output shaft 110 and is connected through a chain 126 to a driven sprocket 127 mounted on a shaft 128. The shaft 128 which comprises the input shaft of a transmission 129 is rotatably mounted in a bearing block 131 suitably mounted on a support member 132 secured adjacent the frames 116, 117 to the frame rear portion 12 as shown best in FIG. 3.

Figure 5:
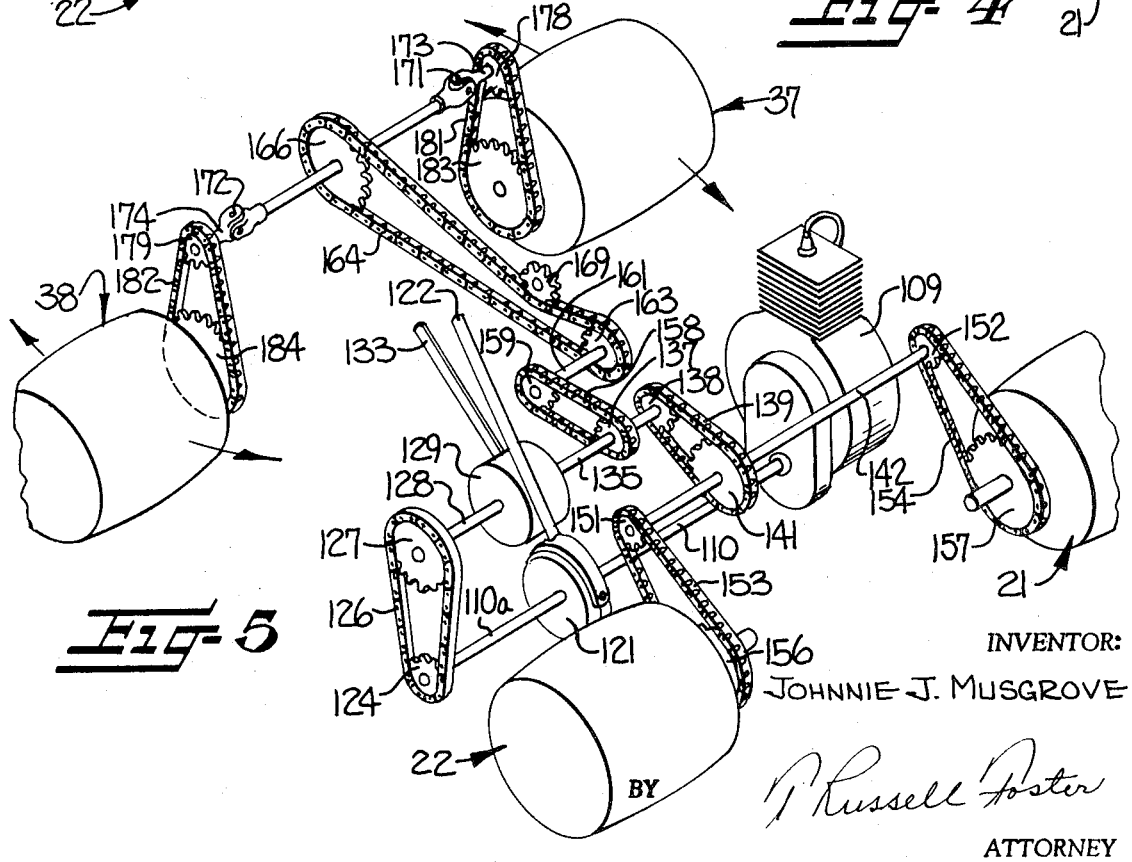
FIG. 5 is a perspective view of the driving arrangement for the wheels of the machine of FIG. 1.

The transmission 129 is preferably of a conventional type which is spring loaded into a neutral position and which is provided with an operating lever 133 accessible from the driver's seat 59 for actuating the transmission for low speed operation of the mowing machine in both forward and reverse drives. The transmission is suitably supported on a plurality of upright members 134 and has an output shaft 135 supported at its outer ends in a bearing block 136. Drive sprockets 137, 138, preferably in the form of a double sprocket, are fixedly mounted on the transmission output shaft 135, sprocket 138 being connected by a chain 139 to a driven sprocket 141 mounted on a transversely extending shaft 142 as shown in FIGS. 4, 5.

The shaft 142 is rotatably supported in a plurality of bearings blocks 143—146 supported on a plurality of bracing members 147—150 respectively suitably mounted on the frame rear portion 12 adjacent the rear wheels 21, 22. Drive sprockets 151, 152 are mounted on opposite ends of the shaft 142 and are connected by means of chains 153, 154 to driven sprockets 156, 157 mounted on the ends of the shafts 23, 24 of the rear wheels 21, 22 respectively.

In order to drive the front wheels 37, 38, sprocket 137 is connected by means of a relatively short chain 158 to a sprocket 159 mounted on one end of a jackshaft 161 suitably arranged as shown best in FIGS. 1, 3 in bearing blocks 162 suitably supported on the frame rear portion 12 as shown. Sprocket 163 is also provided on the jackshaft 161 and is connected by means of a longitudinally extending chain 164 to a driven sprocket 166 suitably mounted on a transversely extending shaft 167. The shaft 167 is rotatably mounted in upstanding bearing pedestals 168 suitably supported on the axle member 34 as shown best in FIG. 1. An idler sprocket 169 is also suitably mounted on the frame front portion 11 in engagement with the driving chain 164 to maintain tension in the chain.

The first shaft means also includes a universal joint associated with each of the front wheels 37, 38 to maintain the driving connection with the shaft 167 during pivotal movement of the front wheels 37, 38. More specifically, universal joints 171, 172 are mounted on opposite ends of the transversely extending shaft 167 and are connected to driven shafts 173, 174 rotatably mounted in pairs of bearing blocks 176, 177 positioned as shown on the upper portions of the front wheel mounting frames 46, 47 respectively as shown best in FIG. 1. Drive sprockets 178, 179 are suitably mounted on the shafts 173, 174 and are connected by means of chains 181, 182 to driven sprockets 183, 184 suitably secured to the shafts 41, 42 of front wheels 37, 38 respectively.

The means for drivably connecting the gasoline motor 109 to the front and rear cutters C, C' and 96 respectively comprises second shaft means including a second clutch 186 having a lever 187 accessible from the operator's seat 59. More specifically, as shown best in FIG. 6, drive sprocket 188 is mounted on the motor output shaft 110 and is connected by means of a chain 189 to a driven pulley 190 mounted on one end of a shaft 191. The drive chain 189 also extends around an idler pulley 192 mounted on a shaft 193 suitably supported in bearing blocks or the like on the frame front portion 11. As the motor output shaft 110 normally rotates in a counterclockwise direction as viewed from the left in FIG. 6 and as shown by the arrow, the arrangement of chain 189 is such that the sprocket 190 and shaft 191 rotate in the opposite direction as also shown by the arrows in FIG. 6 to drive shaft 191a through clutch 186.

A sprocket 196 is provided on shaft 191a and is connected by means of chain 197 to a driven sprocket 198 mounted on a transversely extending shaft 199. The shaft 199 is mounted for rotation in suitable bearing means provided on the frame front portion 11. Pulleys 201, 201' are mounted on opposite ends of the shaft 199 and are connected by means of belts 202, 202' to driven pulleys 203, 203' mounted on the shafts 74, 74' of the front cutters C, C' respectively. Thus, the shafts 74, 74' containing the flails 76, 76' of front cutters C, C' respectively are driven in the direction of the arrows shown in FIG. 6 so as to strike the growth to be mowed upwardly during the forward movement of the mowing machine.

In order to drive the rear cutter 96, a pulley 204 is suitably mounted on the end of shaft 191a opposite the clutch 186 as shown in FIG. 6. The pulley 204 is connected by means of a belt 206 to a pulley 207 mounted on a stub shaft 208 on which is positioned a second pulley 209. The shaft 208 is suitably supported on the frame rear portion 12 as shown best in FIG. 2. The pulley 209 is connected by means of a belt 211 to a driven pulley 212 suitably mounted on one end of the shaft 101 of the rear cutter 96 as shown best in FIGS. 4, 6. Thus, rotation of the shaft 191a in the direction of the arrow of FIG. 6 rotates the shaft 101 of the rear cutter 96 in the direction of the arrow of FIG. 6 through the pulley and belt arrangement shown, thereby moving the rear cutter flails 102 upwardly and forwardly in the direction of the forward movement of the mowing machine similar to the front cutters C, C'.

When the motor 109 has been started to rotate the motor output shaft 110, the operator seated within the seat 59 places the transmission 129 in the desired gear such as forward drive through the lever 133 and subsequently engages the clutch 121 by means of the clutch lever 122. Through the previously described chain and sprocket arrangement, a driving connection is thus established between the motor output shaft 110 and both the front and rear wheels 21, 22 and 37, 38 respectively so that the mowing machine moves in the forward direction with all four wheels positively driven.

When the growth to be mowed is approached by the mowing machine, clutch 186 is actuated through the clutch lever 187 so as to drive the front and rear cutters C, C' and 96 with the flails 76, 76' and 102 respectively striking the growth in an upward direction during the forward movement of the machine performing a highly efficient mowing operation. Directional guidance of the mowing machine of the invention is accomplished by means of the steering wheel 71 and the front wheels 37, 38 adjust to irregular terrain by the pivotal movement of the axle member 34 without affecting the mowing operation by the cutters C, C' and 96.

The caster wheels 86, 86' and the chains 91, 91' permit the front cutters C, C' to maintain in the proper cutting position and, together with the shoes 93, 93', permit the front cutters to adapt to irregular terrain as permitted by the bidirectional pivotal support provided for the front cutters and therefore perform an efficient mowing operation without scalping. At the same time, the combination of the four-wheel drive arrangement of the machine with the provision of the low-pressure, unusually wide tires on the front and rear wheels 37, 38 and 21, 22 respectively provides excellent traction and outstanding stability for the mowing machine so as to prevent overturning and possible injury or damage. Furthermore, the central positioning of the rear cutter 96 permits the mowing of an extremely wide swath of growth, the rear cutter being maintained in the proper cutting position by the chain 106 and shoe members 108 in a manner similar to the front cutters C, C'.

I claim:

1. A rider-steered, four-wheel drive mowing machine comprising, in combination, a frame having a front end, a rear end and a longitudinally extending central axis, a transversely extending front axle member mounted intermediate its ends on said frame adjacent said front end for pivotal movement on said central axis in a substantially vertical plane, a pair of front wheels, means for supporting one of said front wheels on each end of said front axle member for rotation on a horizontal axis and for pivotal movement on an axis extending substantially perpendicular to the axle member, a pair of rear wheels, means for supporting said rear wheels on said frame adjacent said frame rear end in oppositely disposed, transversely spaced relationship for rotation on a horizontal axis, each of said front and rear wheels including a rim of relatively small diameter and a low-pressure, pneumatic tire on said rim, said tire having a width substantially greater than the radial width of the tire sidewall, a pair of transversely aligned, laterally extending front cutters supported on said frame, said front cutters being arranged on opposite sides of said central axis intermediate said front and rear wheels, a transversely extending rear cutter supported on said frame between said rear wheels in centrally aligned relationship with said central axis, power means supported on said frame, means for drivably connecting said power means to said front and rear wheels and to said cutters, an operator seat on said frame intermediate said front and rear wheels and steering means accessible from said operator seat for pivotally moving said front wheels on said perpendicular axis to guide the movement of said mowing machine on a supporting surface.

2. A mowing machine in accordance with claim 1 wherein said front and rear cutters are of the flail type including a rotatable shaft extending substantially perpendicular to said central axis and a plurality of flails pivotally mounted on said shaft and wherein said means for connecting said power means to said cutters includes means for connecting said power means to said cutter shafts.

3. A mowing machine in accordance with claim 2 including means for supporting said front cutters for bidirectional pivotal movement between an elevated inoperative position and a cutting position, said supporting means including means for supporting said front cutters for pivotal movement on an axis extending transversely of said frame in substantially parallel relationship with said cutter shafts and means for supporting said front cutters for pivotal movement on an axis extending longitudinally of said frame adjacent said frame central axis and means for positioning said front and rear cutters in said cutting position.

4. A mowing machine in accordance with claim 3 wherein said positioning means for said front cutters include means on the outer ends of said front cutters engageable with the mowing machine supporting surface for limiting the downward pivotal movement of said front cutters on said longitudinal axis and adjustable means connected to said frame and to each of said front cutters for limiting the downward pivotal movement of said front cutters on said transverse axis to maintain said front cutters in said cutting position during the movement of said mowing machine.

5. A mowing machine in accordance with claim 3 including means for supporting said rear cutter for pivotal movement between an elevated inoperative position and a cutting position on an axis extending transversely of said frame in substantially parallel relationship with said rear cutter shaft and means for maintaining said rear cutter in said cutting position.

6. A mowing machine in accordance with claim 5 wherein said means for maintaining said rear cutter in said cutting position include adjustable means connected to said frame and to said rear cutter for limiting the downward pivotal movement of said rear cutter.

7. A mowing machine in accordance with claim 4 wherein said means on the outer ends of said front cutters include a freely rotatable support wheel on the outer end of each of said front cutters engageable with said supporting surface and including a show member positioned rearwardly of and in elevated relationship with said support wheel on the outer end of each of said front cutters arranged to slidably engage said supporting surface to positively limit the downward pivotal movement of said front cutters on said longitudinal axis to said cutting position.

8. A mowing machine in accordance with claim 3 wherein said power means includes a motor having an output shaft and wherein said means for connecting said power means to said front and rear wheels and to said cutters include a first clutch having a lever accessible from said operator's seat connected to said output shaft, first shaft means including a transmission having a lever accessible from said operator's seat for drivably connecting said front and rear wheels to said motor output shaft through said first clutch and second shaft means including a second clutch having a lever accessible from said operator's seat for connecting said front and rear cutters to said motor output shaft.

9. A mowing machine in accordance with claim 8 wherein said steering means include a steering linkage connected to said front wheels for simultaneous pivotal movement of said front wheels on said perpendicular axis with said wheels in substantially parallel relationship, a steering wheel accessible from said operator's seat and having a shaft connected to said linkage for effecting said pivotal movement of said front wheels and wherein said first shaft means include a universal joint associated with each of said front wheels to maintain said driving connection with said front wheels during said pivotal movement of said front wheels.